United States Patent [19]

Hara

[11] Patent Number: 5,740,418
[45] Date of Patent: Apr. 14, 1998

[54] PIPELINED PROCESSOR CARRYING OUT BRANCH PREDICTION BY BTB

[75] Inventor: Tetsuya Hara, Hyogo, Japan

[73] Assignee: Mitsubishi Denki Kabushiki Kaisha, Tokyo, Japan

[21] Appl. No.: 625,180

[22] Filed: Mar. 29, 1996

[30] Foreign Application Priority Data

May 24, 1995 [JP] Japan .................................. 7-125029

[51] Int. Cl.⁶ .................................................. G06F 9/00
[52] U.S. Cl. ........................................ 395/586; 395/800.01
[58] Field of Search ................................. 395/376, 381, 395/384, 561, 580, 584–587, 414, 421.03, 800.01, 800.23; 364/131–134

[56] References Cited

U.S. PATENT DOCUMENTS

| | | | |
|---|---|---|---|
| 5,440,704 | 8/1995 | Itomitsu et al. | 395/586 |
| 5,471,597 | 11/1995 | Byers et al. | 395/421.03 |
| 5,506,976 | 4/1996 | Jaggar | 395/585 |
| 5,507,028 | 4/1996 | Liu | 395/383 |
| 5,515,518 | 5/1996 | Stiles et al. | 395/586 |
| 5,522,053 | 5/1996 | Yoshida et al. | 395/421.03 |
| 5,530,825 | 6/1996 | Black et al. | 395/421.03 |
| 5,623,614 | 4/1997 | Van Dyke et al. | 395/587 |

OTHER PUBLICATIONS

"Computer Architecture: A Quantitative Approach" by David A. Patterson et al., *Morgan Kaufmann Publishers, Inc.* 1990.

*Primary Examiner*—Alpesh M. Shah
*Attorney, Agent, or Firm*—Lowe, Price, LeBlanc & Becker

[57] ABSTRACT

A pipelined processor includes a main memory, an instruction cache, a BTB, and a BTB registration discriminator for decoding instructions line fetched from the main memory at the time of mishit of the instruction cache and for registering branch information in the BTB when the instruction is a branch instruction. Since the branch information is already stored in the BTB even at the first execution time of the branch instruction, a branch prediction hit ratio is improved.

8 Claims, 5 Drawing Sheets

PIPELINED PROCESSOR CARRYING OUT BRANCH PREDICTION BY BTB

BACKGROUND OF THE INVENTION

1. Field of the Invention

The present invention relates to pipelined processors, and more particularly, to a pipelined processor carrying out branch prediction using hardware called a branch target buffer (hereinafter referred to as a "BTB").

2. Description of the Background Art

In a pipelined processor, performance improvement is mainly hampered by disorder of a pipeline due to branch (branch penalty). In order to reduce this branch penalty, branch prediction is introduced in an ordinary pipelined processor.

One system of branch prediction uses hardware called a BTB. In this system, information required for prediction is held in the BTB, and branch prediction is carried out in the following procedure.

(1) Registration/Update

When a branch instruction is executed, an execution result of the branch instruction such as a branch target address and a branch direction is registered in a BTB entry addressed by the lowermost several bits of an instruction address of the branch instruction, or updated.

(2) Prediction

When an instruction fetch is to be carried out, the BTB is simultaneously accessed at the same address as that with which an instruction cache is accessed. In this case, the BTB is addressed by the lowermost several bits used in the above (1). If history information on an effective instruction is registered at the relevant address of the BTB, a branch direction is predicted based on the history information. In this case, if it is predicted that a branch will be taken, a branch target address is set in a program counter (PC).

(3) Prediction Check

When the branch instruction is executed, the execution result and the branch prediction are verified to check the prediction. When the prediction is erroneous, instructions which have been fed to the pipeline during the period from fetch of the branch instructions to completion of execution of the branch instructions are invalidated, and a correct instruction stream is refetched.

As described above, by branch prediction, prediction check, and registration of the branch information on the branch instruction in the BTB based on the prediction check result, branch prediction is carried out effectively as far as the branch information is registered in the BTB.

However, the above described branch prediction system by the BTB has the following problem. The BTB has a structure similar to an instruction cache. More specifically, similarly to the instruction cache, the BTB is empty in its initial state, and no entry is registered until a branch instruction is executed. Therefore, whenever a branch instruction is executed for the first time, the branch information is not registered in the BTB. When the branch information of the relevant branch instruction is not registered in the BTB, branch prediction is usually carried out, assuming that no branch occurs. Therefore, when the branch instruction does branch, prediction will be always erroneous in the first execution.

If branch prediction of a branch instruction can be effectively carried out even in the first execution, a branch prediction hit ratio can be improved. It is desired that such improvement in the branch prediction hit ratio can be implemented for several kinds of branch instructions. It is preferred in particular that branch prediction can be carried out effectively even for a branch instruction to carry out branch target addressing of a program counter relative system. Further, it is desired that hardware is as simple as possible in improving the branch prediction hit ratio.

SUMMARY OF THE INVENTION

One object of the present invention is to improve a branch prediction hit ratio of a pipelined processor having a BTB.

Another object of the present invention is to improve a branch prediction hit ratio of a pipelined processor having a BTB for various kinds of branch instructions.

Still another object of the present invention is to improve a branch prediction hit ratio of a pipelined processor having a BTB for various kinds of branch instructions including a branch target instruction whose branch target address changes depending on the content of a program counter.

A further object of the present invention is to improve a branch prediction hit ratio of a pipelined processor having a BTB for a plurality of kinds of branch instructions with a circuit of a relatively simple structure.

A pipelined processor according to the present invention includes a main memory, a program counter in the main memory specifying an address of an instruction to be executed, an instruction executing unit reading out an instruction at the address specified by the program counter from the main memory for execution, a high speed accessible instruction cache memory reading out, when it does not store an instruction reading of which is requested by the instruction executing unit, a group of instructions including the relevant instruction from the main memory for storage, and applying the instruction, when reading from the same address is again requested, to the instruction executing unit without accessing the main memory, a BTB for storing branch information on a branch instruction to be executed by the instruction executing unit, and for carrying out branch prediction based on the branch information to set the program counter to an address of an instruction to be read out next to the branch instruction, and a BTB registration discriminator decoding the instruction read out from the main memory to the instruction cache memory, and registering, when the instruction is a branch instruction, branch information on the relevant branch instruction in the BTB.

In the pipelined processor thus structured, when an instruction reading of which is requested by the instruction executing unit is not present in the instruction cache memory, a group of instructions including the relevant instruction are read out from the main memory to be stored in the instruction cache memory. At this time, the BTB registration discriminator decodes these instructions, and when the instruction turns out to be a branch instruction, registers branch information on the relevant branch instruction in the BTB. Also when the branch instruction is stored in the instruction cache memory for execution for the first time, effective branch information is to be registered in the BTB. It is possible to carry out effective branch prediction even at execution of an instruction for the first time. Therefore, increase in a branch prediction hit ratio can be expected.

The BTB registration discriminator may include a decoder decoding the instruction read out from the main memory to the instruction cache memory to output a registration command signal commanding the BTB to register the branch information, and a branch information generating unit generating necessary branch information according to the kind of the instruction decoded by the decoder to give the information to the BTB.

In the pipelined processor thus structured as described above, the decoder decodes the instruction, and outputs the registration command signal commanding the BTB to register the branch information. In response to this signal, the branch information generating unit generates necessary branch information according to the kind of the instruction decoded by the decoder to give the information to the BTB. Necessary branch information can be registered in the BTB according to the kind of the branch instruction. Increase in the branch prediction hit ratio can be expected for various kinds of branch instructions.

The decoder may include a decoder for decoding the instruction read out from the main memory to the instruction cache memory to output the registration command signal when the relevant instruction is one of a predetermined plurality of kinds of branch instructions, and to output an instruction discriminate signal indicating to which branch instruction among the predetermined plurality of kinds of branch instructions, the relevant instruction corresponds. The branch information generating unit may include a branch target address generating unit generating a branch target address for each of the predetermined plurality of kinds of instructions based on an operand of the instruction read out from the main memory to the instruction cache memory and the content of the program counter, and a selecting unit responsive to the instruction discriminate signal for selecting any one of the outputs of the branch target address generating unit to apply the selected output to the BTB.

In the pipelined processor structured as described above, the decoder decodes the instruction read out from the main memory to the instruction cache memory, outputs the registration command signal when the relevant instruction is one of the predetermined plurality of kinds of branch instructions, and outputs the instruction discriminate signal indicating to which branch instruction among the predetermined plurality of kinds of branch instructions the relevant instruction corresponds. The branch target address generating unit generates the branch target address for each of the predetermined plurality of kinds of instructions based on the operand of the instruction read out from the main memory to the instruction cache memory and the content of the program counter. In response to the instruction discriminate signal, the selecting unit selects any one of the outputs of the branch target address generating unit and applies the selected output to the BTB. Therefore, increase in the branch prediction hit ratio can be expected even for such a branch instruction whose branch target address changes depending on the content of the program counter.

Registration specifying information may be set in advance in the branch instruction for specifying whether or not branch information on the relevant branch instruction is to be registered in the BTB. The BTB registration discriminator may include a decoder decoding the instruction read out from the main memory to the instruction cache memory, a branch information generating unit generating necessary branch information according to the kind of the instruction decoded by the decoder to give the generated branch information to the BTB, and a registration command unit commanding the BTB to register the branch information according to the registration specifying information.

In the BTB registration discriminator of the pipelined processor structured as described above, the decoder decodes the instruction read out from the main memory to the instruction cache memory. The branch information generating unit generates necessary branch information according to the kind of the instruction decoded by the decoder to give the branch information to the BTB. The registration command unit commands the BTB to register the branch information according to the registration specifying information.

Since the registration command unit commands the BTB to register the branch information according to the registration specifying information included in the instruction, increase in the branch prediction hit ratio can be implemented for a plurality of kinds of branch instructions with a relatively simple circuit.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

First Embodiment

Figure 1:
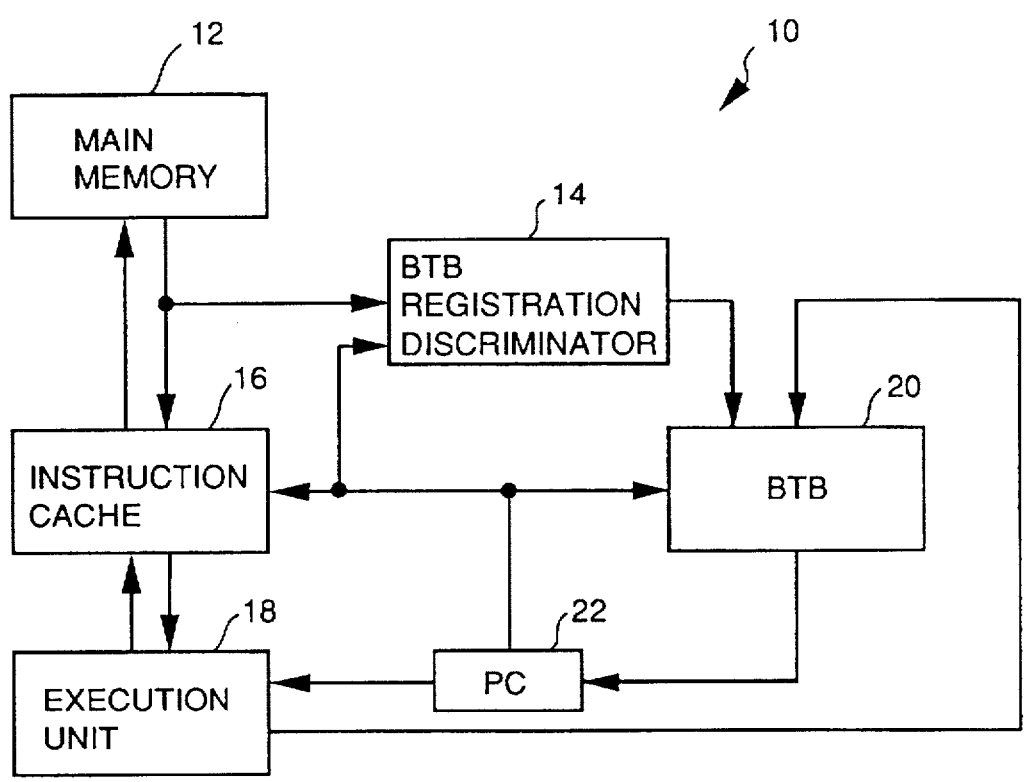
FIG. 1 is a schematic block diagram of a pipelined processor according to a first embodiment of the present invention.

Referring to FIG. 1, a pipelined processor 10 of the first embodiment according to the present invention includes a program counter 22, a main memory 12 for storing a program to be executed and the like, an executing unit 18 which fetches instructions specified by program counter 22 from main memory 12 to execute the instructions in a pipelined architecture, a high speed accessible instruction cache 16 for storing a group of instructions including the instructions read out from main memory 12 and giving, when reading of the relevant instructions is again requested by executing unit 18, the instructions to executing unit 18 without accessing main memory 12, a BTB 20 for storing branch information of branch instructions, and a BTB registration discriminator 14 as a registration specifying means for discriminating whether or not the instructions read out from main memory 12 to instruction cache 16 are branch instructions, and for registering branch information on the relevant branch instructions in BTB 20 according to the discrimination result.

Note that both instruction cache 16 and BTB 20 use the lowermost several bits of an address of an instruction output from program counter 22 for addressing in reading out information stored therein. Reading of instructions from main memory 12 by instruction cache 16 is called a line fetch, and a plurality of instructions are read out at one time.

Figure 2:
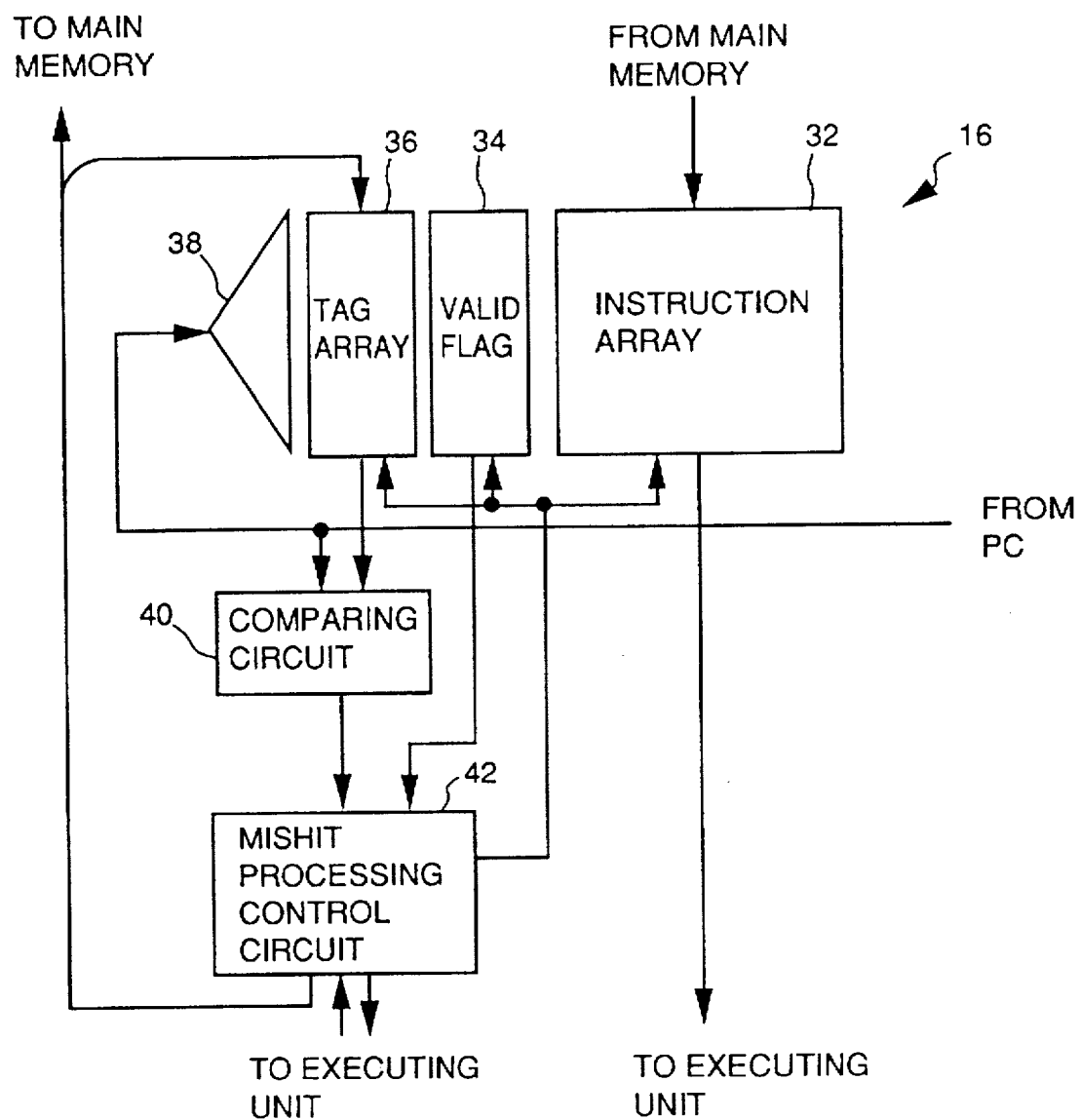
FIG. 2 is a block diagram of an instruction cache of the first embodiment.

Referring to FIG. 2, instruction cache 16 includes an instruction array 32 for storing the instructions read out from main memory 12, a tag array 36 for storing a tag indicating the uppermost several bits of addresses in main memory 12 of the instructions stored in each entry of instruction array 32, a valid flag region 34 storing valid flags indicating whether each entry in instruction array 32 is valid or not, a decoder 38 selecting a respective one entry of tag array 36, valid flag region 34, and instruction array 32 using the lowermost several bits of an address applied from program counter 22, a comparing circuit 40 for comparing a tag portion of the address applied from program counter 22 and the tag output from tag array 36 to output a match signal, and a mishit processing control circuit 42 refetching instructions from main memory 12 according to the output of comparing circuit 40, a value of the valid flag output from valid flag region 34, and an execution result of the branch instructions applied from executing unit 18 to update tag array 36, valid flag region 34, and instruction array 32.

When reading of the instructions is requested by executing unit 18, the valid flag of an address specified by the lowermost several bits of the address applied from program counter 22 takes a value indicating "valid," and the tag stored in the relevant address matches the tag of the address output from program counter 22, the content of the relevant entry of instruction array 32 is applied to executing unit 18.

Figure 3:
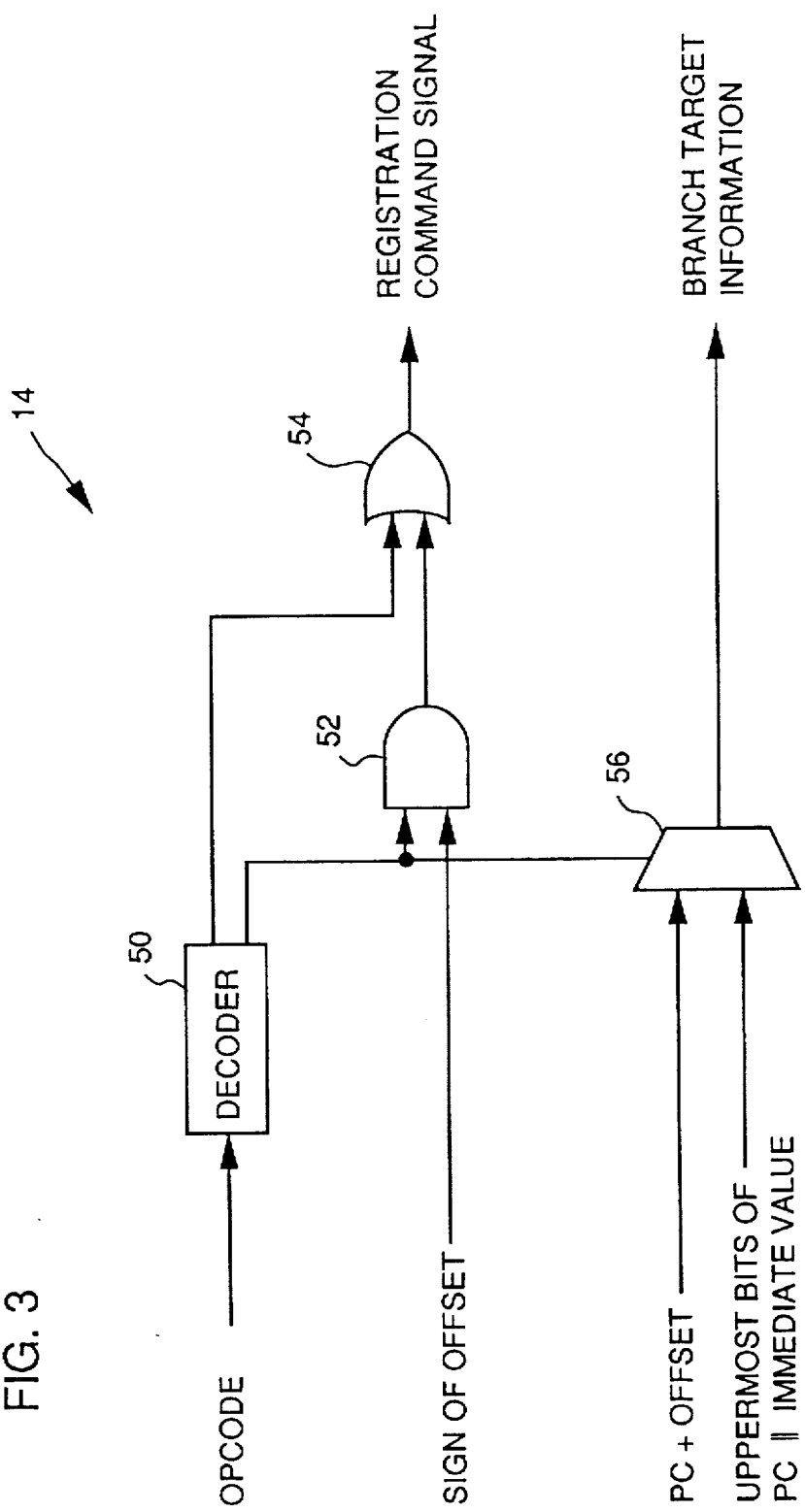
FIG. 3 is a block diagram of a BTB registration discriminator of the first embodiment.

Referring to FIG. 3, BTB registration discriminator 14 of FIG. 1 includes a decoder 50, an AND circuit 52, an OR circuit 54, and a selector 56.

Decoder 50 has an input receiving operands of the instructions read out from main memory 12 to instruction cache 16. Decoder 50 has two outputs, one of which is connected to one input of OR circuit 54. The other output of decoder 50 is connected to one input of AND circuit 52 and a control terminal of selector 56.

The other input of AND circuit 52 receives a sign bit of a portion corresponding to an offset portion of a program counter relative branch instruction of the operands in the instructions read out from main memory 12 to instruction cache 16. An output of AND circuit 52 is connected to one of the two inputs of OR circuit 54, which is not connected to the output of decoder 50.

The output of OR circuit 54 is a registration command signal, which is applied to BTB 20 shown in FIG. 1.

Selector 56 has two inputs in this embodiment, one of which receives a value of the output of program counter 22 plus the offset portion of the PC relative branch instruction of the operands of the instructions read out from main memory 12 to instruction cache 16. The other input of selector 56 receives a concatenation of the uppermost several bits of the PC and an immediate value in the operands of the instructions read out from main memory 12 to instruction cache 16. The output of selector 56 is applied to BTB 20. Selector 56 selects PC+offset when a control signal applied from decoder 50 is at a high level and the concatenation of the uppermost several bits of the PC and the immediate value when the control signal is at a low level, respectively, for output.

When an operation code is an unconditional branch instruction, decoder 50 applies a signal at the high level to OR circuit 54, and otherwise a signal at the low level to OR circuit 54. When the operation code is the PC relative branch instruction, decoder 50 applies a signal at the high level to AND circuit 52 and selector 56, and otherwise a signal at the low level to AND circuit 52 and selector 56.

Figure 4:
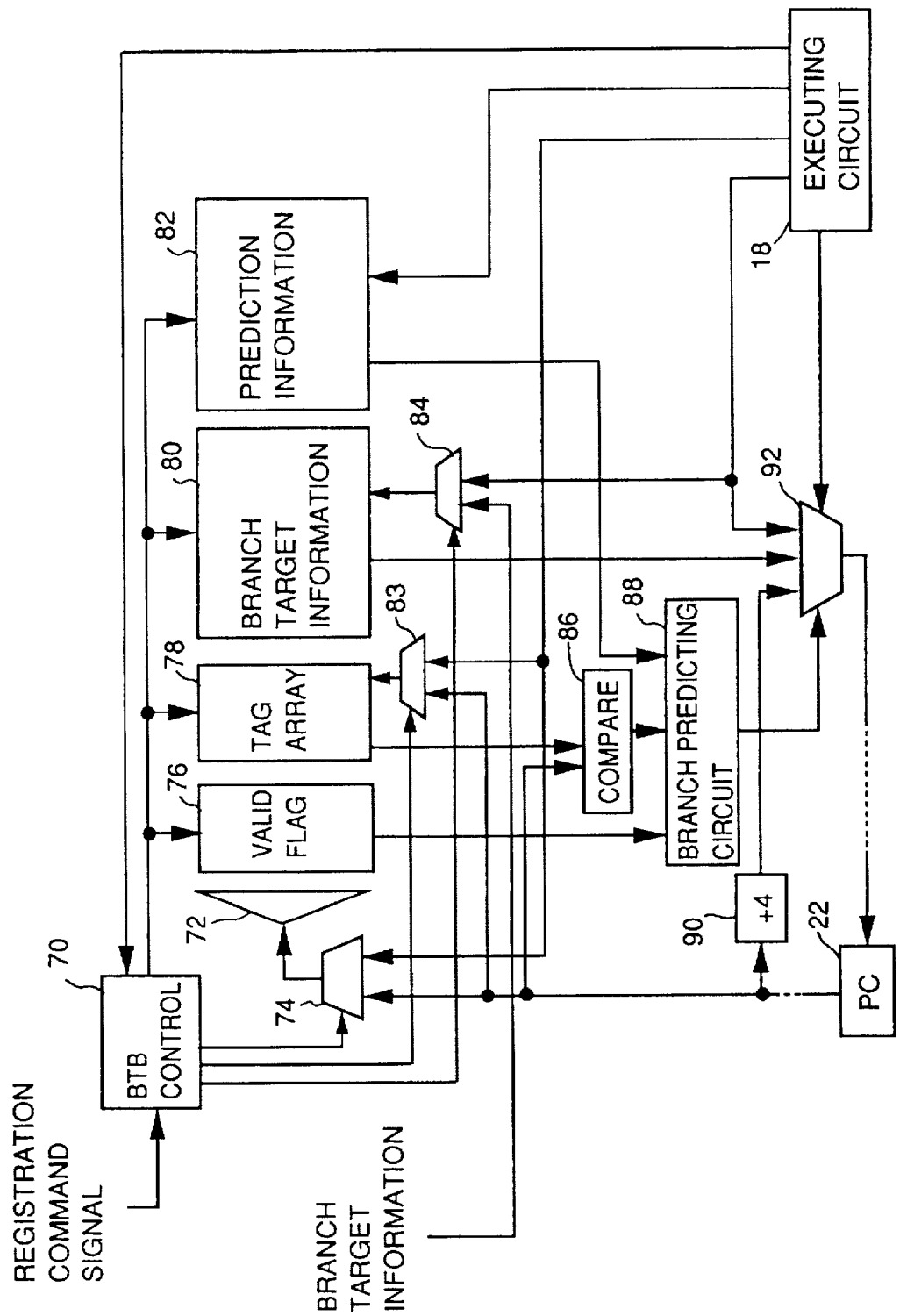
FIG. 4 is a block diagram of a BTB of the first embodiment.

FIG. 4 shows a block circuit diagram of BTB 20. Referring to FIG. 4, BTB 20 includes a BTB control circuit 70, a decoder 72, a selector 74, a valid flag array 76, a tag array 78, a branch target information region 80, a prediction information region 82, selectors 83 and 84, a comparing circuit 86, a branch predicting circuit 88, an incrementor 90, and a selector 92.

BTB control circuit 70 updates the contents of valid flag array 76, tag array 78, branch target information region 80, and prediction information region 82 in response to mishit information from executing unit 18 and a registration command signal from BTB registration discriminator 14. BTB control circuit 70 also controls selectors 74, 83, and 84 as will be described later, to control reading of branch information from BTB 20 and writing of branch information to BTB 20.

One input of selector 74 is connected to program counter 22. The other input of selector 74 is connected to an output of executing unit 18, and receives addresses of branch instructions from executing unit 18. According to the control of BTB control circuit 70, selector 74 selects the output of program counter 22 in reading of the branch information and the output of executing unit 18 in writing of the branch information, respectively, to apply the selected output to decoder 72. Selector 74 selects the output of program counter 22 according to the control of BTB control circuit 70 even when the registration command signal is at the high level. Note that the input and the output to and from selector 74 both correspond to the lowermost several bits of the address output from program counter 22. This is because a BTB entry cannot be prepared for all addresses due to the limited amount of hardware of BTB 20. It is determined based on the content of tag array 78 and the content of valid flag 76 to which instruction the information actually stored in BTB 20 corresponds. More specifically, tag array 78 stores the uppermost several bits (tag) of an address corresponding to the information stored in each entry of branch target information region 80. Valid flag array 76 stores a flag indicating whether the contents of entries of corresponding branch target information region 80 and prediction information region 82 are valid or not.

One input of selector 83 is connected to program counter 22, and receives the tag portion of the output of program counter 22. The other input of selector 83 receives the output of executing unit 18 and the tag portions of the addresses of the branch instructions. Selector 83 is controlled by BTB control circuit 70, selects the output of executing unit 18 at the time of misprediction, and otherwise selects the output of program counter 22, to apply the selected output to tag array 78.

One input of selector 84 is connected to the output of executing unit 18, and receives a branch target address at the time of misprediction. The other input of selector 84 receives branch target information from BTB registration discriminator 14. Under the control of BTB control circuit 70, selector 84 selects the branch target information when branch information of the branch instructions read out from main memory 12 to instruction cache 16 is registered and the output of executing unit 18 when misprediction occurs as a result of execution of the branch instructions by executing unit 18, respectively, and applies the selected information or output to branch target information region 80.

Comparing circuit 86 compares an entry of tag array 78 selected by decoder 7 2 and the uppermost several bits (tag) of an output address of program counter 22, and applies the comparison result to branch predicting circuit 88.

Branch predicting circuit 88 determines which to select between an output of incrementor 90 and an entry of branch target information region 80 selected by decoder 72 based on the content of an entry of valid flag 76 selected by decoder 72, the output of comparing circuit 86, and an entry of prediction information region 82 selected by decoder 72 (branch prediction), and applies a branch predict signal to selector 92. Since an instruction access is usually carried out on a block basis with a portion where the lowermost two bits of an address are "00" as a boundary in the case of a processor of 32-bit architecture, incrementor 90 adds four to the output of program counter 22 as the next address to be accessed.

Selector 92 has three inputs. The first input is connected to the output of incrementor 90 as described above. The second input is connected to an output of branch target information region 80. The third input is connected to the output of executing unit 18 and receives actual branch target addresses of the branch instructions at the time of misprediction. Selector 92 is controlled by the output of branch predicting circuit 88 and the output of executing unit 18, and at the time of branch prediction, outputs and sets in program counter 22 either the output of incrementor 90 or the output of branch target information region 80 according to a control signal from branch predicting circuit 88. On the other hand, at the time of misprediction, selector 92 selects and sets program counter 22 to the actual branch target address applied from executing unit 18.

Referring to FIGS. 1 to 4, the pipelined processor according to the first embodiment operates as follows.

Executing unit 18 applies reading of an instruction from an address specified by program counter 22 to instruction cache 16. Instruction cache 16 decodes the lowermost several bits of a value of program counter 22, and selects corresponding entries of tag array 36, valid flag array 34, and instruction array 32. A corresponding tag, a corresponding valid flag, and a corresponding instruction are output from tag array 36, valid flag array 34, and instruction array 32.

Referring to FIG. 2, comparing circuit 40 compares the tag portion of the address applied from program counter 22 and the output of tag array 36, and applies a signal indicating whether or not the tag portion matches the output to mishit processing control circuit 42. Mishit processing control circuit 42 determines it as generation of a cache miss when the output of comparing circuit 40 is a value indicating mismatching and when the valid flag output from valid flag array 34 is a value indicating invalid, and requests main memory 12 (cf. FIG. 1) to carry out reading from the relevant address.

A group of instructions including the instruction of the relevant address are line fetched from main memory 12, and applied to instruction array 32. Instruction array 32 stores the instructions in entries selected by decoder 38. Simultaneously, the tag portion of the address used for reading of main memory 12 is stored in tag array 36. The entry at this time is one selected by decoder 38. The valid flag in valid flag array 34 corresponding to this entry is set at a value indicating "valid."

As described above, once the relevant instruction is stored in instruction array 32, the output of comparing circuit 40 indicates "matching" and the valid flag output from valid flag array 34 has a value indicating "valid." In this case, mishit processing control circuit 42 indicates to executing unit 18 that the output of instruction array 32 is valid, and executing unit 18 receives the output of instruction array 32 for execution.

Referring to FIG. 1, when the above described cache miss occurs, an instruction stream including the required instruction (this is called a cache line usually including 8 to 32 instructions) is fetched from main memory 12. In fetching of the cache line, one to two instructions are processed during one cycle.

When instructions are read out from main memory 12 to instruction cache 16, the instructions are also applied to BTB registration discriminator 14.

Referring to FIG. 3, decoder 50 determines whether or not the operation code of the applied instructions is an unconditional branch instruction. When the operation code is the unconditional branch instruction, decoder 50 applies a signal at the high level to one input of OR circuit 54, and when the operation code is not the unconditional branch instruction, decoder 50 applies a signal at the low level to one input of OR circuit 54. Decoder 50 further applies a signal at the high level to AND circuit 52 and selector 56 when the operation code is a PC relative branch instruction and applies a signal at the low level to AND circuit 52 and selector 56 otherwise.

A value of program counter 22 and a value corresponding to the offset portion of the PC relative branch instruction in the operand in the applied instruction are generated in a circuit, not shown, and applied to one input of selector 56. Similarly, a value obtained by concatenating the uppermost several bits of program counter 22 and the immediate value in the operand is applied to the other input of selector 56. Selector 56 selects PC+ offset when a signal from decoder 50 is at the high level and the concatenation of the uppermost several bits of the PC and the immediate value when the signal is at the low level, and applies the selected value to BTB 20 (cf. FIG. 1) as branch target information.

The other input of AND circuit 52 receives a sign bit of a portion corresponding to the offset of the PC relative branch instruction of the operand. It is assumed that the sign bit is 0 when the sign is positive, and 1 when the sign is negative. Therefore, AND circuit 52 applies a signal at the high level to the other input of OR circuit 54 when the decoded instruction is the PC relative branch instruction, and the sign of the offset is negative.

The registration command signal is applied to BTB 20 by the function of OR circuit 54 in the cases where the instruction decoded by decoder 50 is the unconditional branch instruction, and where the instruction is the PC relative branch instruction and the sign of the offset is negative. The latter case is a so-called backward branch. This is because it is found that a branch usually occurs at a high probability in the case of the backward branch. One example of the backward branch is the last branch instruction of a loop processing where processing is carried out several times until a predetermined condition is satisfied.

Referring to FIG. 4, BTB 20 operates as follows. First, suppose that the registration command signal is applied from BTB registration discriminator 14. In this case, BTB control circuit 70 controls selector 74 and selects the lowermost bits of the output of program counter 22 to apply the selected bits to decoder 72. As a result, corresponding entries of valid flag array 76, tag array 78, branch target information region 80, and prediction information region 82 are selected. The uppermost bits (tag) of the output of program counter 22 are applied to tag array 78 through selector 83. Branch target information from BTB registration discriminator 14 is applied to branch target information region 80 through selector 84. These information items are all stored in the selected entries of tag array 78 and branch target information region 80. Simultaneously, the corresponding entry of valid flag array 76 is set to a value indicating "valid."

Reading of branch information from BTB 20 and branch prediction are carried out as follows. BTB control circuit 70 controls selector 74 to select the lowermost bits of program counter 22 and applies the selected bits to decoder 72. Decoder 72 selects the corresponding entries of valid flag array 76, tag array 78, branch target information region 80, and prediction information region 82. Therefore, a valid flag of the corresponding entry, a tag of the corresponding entry, a prediction branch target address stored in the corresponding entry, and prediction information stored in the corresponding entry are output from valid flag array 76, tag array 78, branch target information region 80, and prediction information region 82, respectively.

Comparing circuit 86 compares the uppermost bits (tag portion) of the address applied from program counter 22 and the output of tag array 78, and applies a signal at the high level to branch predicting circuit 88 when the two inputs match. When the two inputs do not match, comparing circuit 86 applies a signal at the low level to branch predicting circuit 88.

Branch predicting circuit 88 predicts whether or not a branch occurs in the branch instruction based on the output of prediction information region 82 when the valid flag indicates "valid," and the output of comparing circuit 86 indicates "matching." When it is predicted that a branch will occur, branch predicting circuit 88 controls selector 92 to select the output of branch target information region 80. Therefore, the prediction branch target address output from branch target information region 80 is stored in program counter 22.

When it is predicted that a branch will not occur, branch predicting circuit 88 controls selector 92 to select the output of incrementor 90. Therefore, the immediately preceding value of the program counter plus four is stored in program counter 22.

As described above, the next instruction is to be fetched according to branch prediction.

BTB 20 operates as follows when branch misprediction occurs. At this time, a signal indicating that misprediction has occurred is applied to BTB control circuit 70 from executing unit 18. A branch target address is applied to selector 92 and selector 84 from executing unit 18 according to the execution result of the actual branch instruction. Further, information on execution history is applied to prediction information region 82. The lowermost bits of the address of the branch instruction executed by executing unit 18 are applied to selector 74. The uppermost bits (tag) of the branch instruction are applied to selector 83.

Selector 74 applies the address provided from executing unit 18 to decoder 72 under the control of BTB control circuit 70. Therefore, decoder 72 selects an entry of the address specified the address most bits of the address of the branch instruction which executing unit 18 has executed and in which misprediction has occurred in valid flag array 76, tag array 78, branch target information region 80, and prediction information region 82.

Similarly, selector 83 selects the uppermost bits (tag) of the address of the branch information which executing unit 18 has executed under the control of BTB control circuit 70, and applies the selected tag to tag array 78. The selected entry of tag array 78 stores this tag.

Selector 84 also selects the branch target address output from executing unit 18 and applies the selected address to branch target information region 80 under the control of BTB control circuit 70. The selected entry of branch target information region 80 stores this branch target address.

The selected entry of prediction information region 82 stores the prediction information applied from executing unit 18.

A value indicating "valid" is stored in the selected entry of valid flag array 76.

In response to a signal indicating generation of a mishit applied from executing unit 18, selector 92 selects the branch target address output from executing unit 18 to apply the selected address to program counter 22. Therefore, the value of program counter 22 indicates the branch target address according to the actual execution result of the branch instruction.

Although not shown, instructions which have already been fed to the pipeline are invalidated at this time.

As described above, according to the first embodiment of the present invention, even at the first execution time of a branch instruction, the prediction of which was not possible in the conventional system, branch prediction information (such as branch target address) of the branch instruction is registered in a corresponding entry of the BTB. Therefore, prediction can be carried out effectively even at the first execution time of the branch instruction, and increase in the branch prediction hit ratio can be expected.

Second Embodiment

In the above described first embodiment, prediction can be carried out effectively even at the first execution time of the branch instruction. A PC relative branch instruction and an unconditional branch instruction are examples of an instruction whose branch can be predicted effectively.

As mentioned previously, it can be said that a backward branch has a high branch probability in general. However, some branch instructions may scarcely be taken. Further, some forward branches may have an extremely high branch probability. With the method described in the first embodiment, even if backward branches having a low branch probability and forward branches having a high branch probability are intermixed, it is not possible to discriminate between them. Therefore, at the time of prediction of these branch instructions, the branch is often predicted in a direction opposite to the actual branch direction. For these instructions, if such a tendency is known in advance, such misprediction should be prevented.

Further, registration of a backward branch having a low branch probability in the BTB causes the following problem. As described above, since the BTB uses a relatively small amount of hardware effectively, it does not prepare entries for all the instructions in the instruction cache. Generally, several instructions share one entry. Therefore, registration of one instruction in an entry of the BTB may result in removing another instruction already registered in the entry from the BTB. Assuming that a newly registered instruction has a low branch probability, and that an instruction which has already been registered has a high branch probability, increase in the prediction hit ratio cannot be expected by registration of such an instruction having a low branch probability in the BTB. On the contrary, registration of such an instruction having a low branch probability hampers effective branch prediction of the instruction having a high branch probability which has already been registered. Therefore, there is a possibility of reduction of the branch prediction hit ratio.

The second embodiment to be described hereinafter can solve such a problem with a relatively small amount of hardware.

In this embodiment, at the time of compilation of a program, a branch instruction which is predicted to be taken is specified in advance by a compiler. When instructions are line fetched from the main memory to the instruction cache, branch information of these instructions is to be registered in the BTB. As a method of prediction at the time of compilation, several methods are considered including prediction according to the kind of instruction (unconditional branch or backward branch), determination based on a flow graph of instructions, and prediction based on the trace result of execution of the relevant program.

The pipelined processor according to the second embodiment is approximately the same as that of the first embodiment shown in FIG. 1 in structure. However, the pipelined processor of the second embodiment is different from that of the first embodiment only in that the second embodiment uses a BTB registration discriminator 114 for discriminating whether or not branch prediction information is to be registered in the BTB based on the content of an instruction, instead of BTB registration discriminator 14 of the first embodiment. Therefore, the detailed description of the same portions as those of the first embodiment will not be repeated here.

In this embodiment, a BTB registration bit indicating whether branch prediction information should be registered in the BTB or not is provided in an instruction field of a branch instruction. As described above, the compiler sets the BTB registration bit of an instruction having a high branch probability based on the static branch prediction result, and resets the BTB registration bit of an instruction having a low branch probability.

Figure 5:
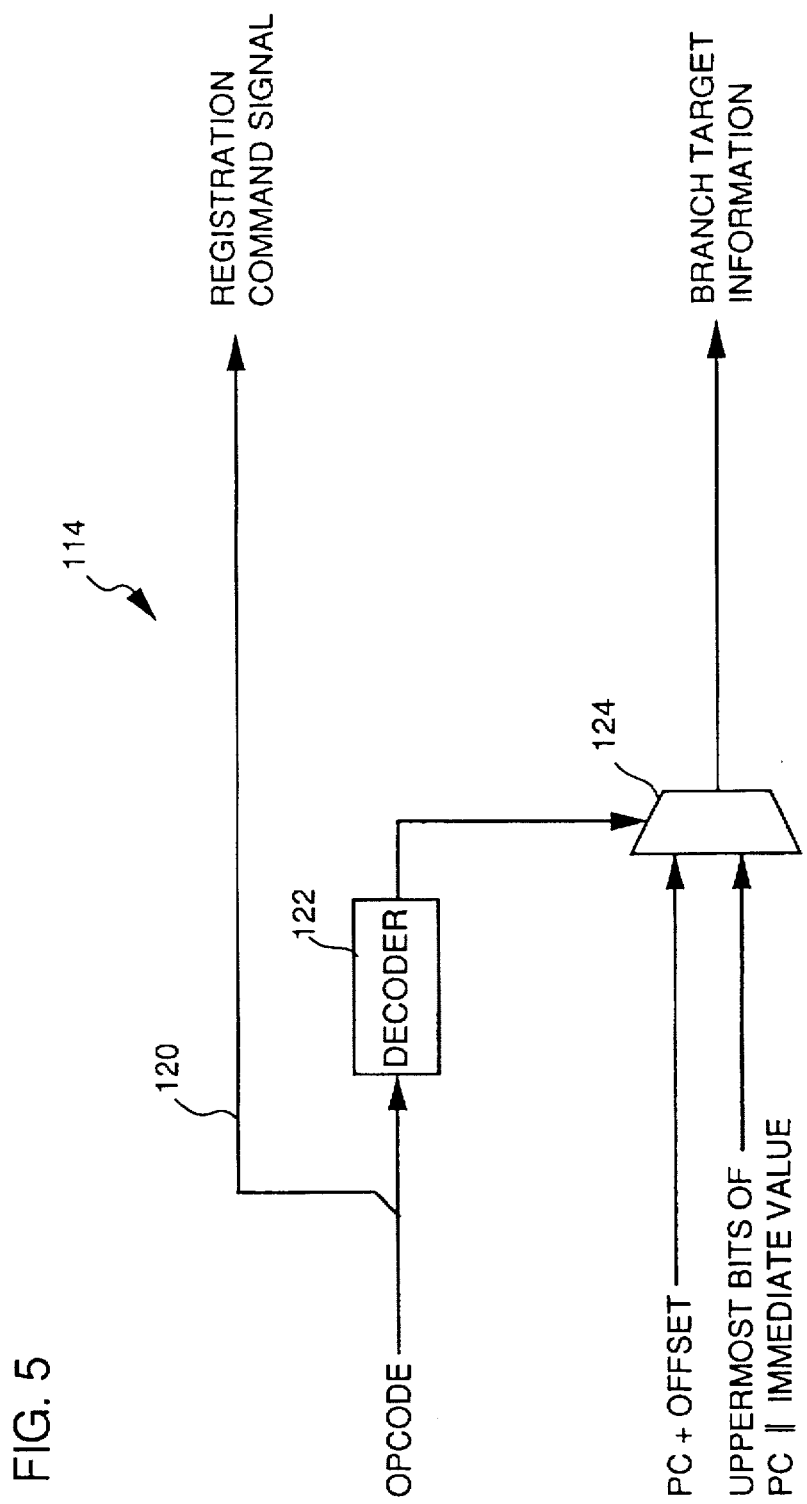
FIG. 5 is a block diagram of a BTB registration discriminator of a second embodiment.

Referring to FIG. 5, BTB registration discriminator 114 includes a decoder 122 for decoding an operation code of an instruction read out from main memory 12 (cf. FIG. 1) to instruction cache 16, and outputting a signal at the high level when the instruction is a PC relative branch instruction and otherwise a signal at the low level, an interconnection 120 for extracting a BTB registration bit of the operation code as a registration command signal, and a selector 124 for receiving a sum of a value of the program counter and the offset amount in the operands of the instructions at one input and a concatenation of the uppermost bits of the output of the program counter and an immediate value in the operand at the other input to select a value of either input according to the output of decoder 122 for output as branch target information.

The inputs to selector 124 are generated by a circuit, not shown. These inputs can easily be generated based on the output of program counter 22 and the contents of the instructions read out from main memory 12.

The pipelined processor of the second embodiment operates as follows. In the following, only BTB registration discriminator 114 will be described.

First, suppose that the applied instruction is a PC relative branch instruction, and the BTB registration bit is set. In this case, the registration command signal extracted by interconnection 120 is at the high level. Therefore, branch prediction information is registered in BTB 20. The content of the information to be registered is determined as follows.

Decoder 122 decodes the operation code, and applies a signal at the high level to selector 124 in this case. In response to the signal at the high level, selector 124 selects PC+ offset, and applies the same to BTB 20 as branch target information. Therefore, the PC+offset is stored in BTB 20 as the branch target information of the relevant PC relative branch instruction.

Then, suppose that the instruction is a PC relative branch instruction, and the BTB registration bit is reset. In this case, the registration command signal is at the low level. Therefore, branch prediction information is not registered in BTB 20.

Then, suppose that the instructions read out from main memory 12 are an unconditional branch instructions. In this case, the compiler sets the BTB registration bit in advance as described above.

Decoder 122 decodes the operation code, and applies a signal at the low level to selector 124 in this case. In response to the signal at the low level, selector 124 selects a concatenation of the uppermost bits of the program counter and a value of an immediate value field, and applies the same to BTB 20 as the branch target information. Therefore, an absolute address of a target of the unconditional branch instructions is to be stored in BTB 20.

As described above, at the time of cache line fetch, each instruction is decoded by the BTB registration discriminator. When the instruction is a branch instruction, the BTB registration bit thereof is referenced. If the BTB registration bit of the branch instruction is set, the prediction information is registered in the BTB. On the other hand, even if the instruction is a branch instruction, the prediction information is not registered in the BTB, if the BTB registration bit of the branch instruction is reset.

Irrespective of the kind of the branch instruction, only a branch instruction having a high branch probability can be registered in the BTB at the time of cache line fetch. A forward branch instruction having a high branch probability can predict that a branch will be taken at the first execution time. A backward branch instruction having a low branch probability does not predict that a branch will be taken since such an instruction is not registered in the BTB. Since an instruction having a low branch probability is not registered in the BTB, only effective information for prediction is stored in each entry of the BTB, making it possible to use the BTB efficiently.

As described above, according to the pipelined processor of the present invention, the instructions read out from the main memory to the instruction cache memory are decoded by the BTB. When the instructions are branch instructions, branch information on the relevant branch instructions is stored in the BTB. Even when the relevant branch instructions are stored in the instruction cache memory for the first time for execution, effective branch information is to be registered in the BTB. Branch prediction can be carried out effectively even when the instructions are executed for the first time. Therefore, increase in the branch prediction hit ratio can be expected.

Further, according to the pipelined processor of the present invention, necessary branch information can be registered in the BTB according to the kind of the branch instruction. Therefore, increase in the branch prediction hit ratio can be expected for various kinds of branch instructions. Further, when the relevant instructions is one of a predetermined plurality of kinds of branch instructions, respective branch target addresses for the predetermined plurality of kinds of instructions are generated based on the operands of the instructions read out from the main memory to the instruction cache memory and the content of the program counter, and one of the branch target addresses is selected according to the kind of the relevant instruction, to be applied to the BTB. Therefore, increase in the branch prediction hit ratio can be expected even for a branch instruction whose branch target address changes depending on the content of the program counter.

Further, according to the pipelined processor of the present invention, the instructions read out from the main memory to the instruction cache memory are decoded, and necessary branch information is generated according to the kind of the decoded instructions to be applied to the BTB. A mechanism for registration command commands the BTB to register branch information according to the registration specifying information included in the instructions. The branch prediction hit ratio can be increased for a plurality of kinds of branch instructions with a relatively simple circuit.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A pipelined processor, comprising:

a main memory;

a program counter specifying an address of an instruction to be executed in said main memory;

instruction executing means for reading out an instruction of the address specified by said program counter from said main memory for execution;

a high speed accessible instruction cache memory for reading out, when it has not stored the instruction requested by said instruction executing means, a group of instructions including the relevant instruction from said main memory for storage, and for applying the relevant instruction to said instruction executing means without accessing said main memory when reading from the same address is next requested;

a BTB for storing branch information on a branch instruction to be executed by said instruction executing means for carrying out branch prediction based on said branch information to set an address of an instruction to be read out next to the branch instruction in said program counter; and BTB registration discriminating means for decoding the instruction read out from said main memory to said instruction cache memory to register, when the instruction is a branch instruction, branch information on the relevant branch instruction in said BTB.

2. The pipelined processor according to claim 1, wherein said BTB registration discriminating means includes decoding means for decoding the instruction read out from said main memory to said instruction cache memory to output a registration command signal commanding said BTB to register branch information, and branch information generating means for generating necessary branch information according to the kind of the instruction decoded by said decoding means to apply the generated branch information to said BTB.

3. The pipelined processor according to claim 2, wherein said decoding means includes a decoder for decoding the instruction read out from said main memory to said instruction cache memory to output said registration command signal when the relevant instruction is one of a predetermined plurality of kinds of branch instructions, and to output an instruction discriminate signal indicating to which branch instruction of said predetermined plurality of kinds of branch instructions the relevant instruction corresponds, said branch information generating means includes branch target address generating means for generating respective branch target addresses of said predetermined plurality of kinds of instructions based on an operand of the instruction read out from said main memory to said instruction cache memory and the content of said program counter, and selecting means responsive to said instruction discriminate signal for selecting and applying to said BTB any one of the outputs of said branch target address generating means.

4. The pipelined processor according to claim 1, wherein registration specifying information for specifying whether or not the branch information on the relevant branch instruction should be registered in the BTB is set in advance in the branch instruction, said BTB registration discriminating means includes decoding means for decoding the instruction read out from said main memory to said instruction cache memory, branch information generating means for generating and applying to said BTB necessary branch information according to the kind of the instruction decoded by said decoding means, and registration command means for commanding said BTB to register the branch information according to said registration specifying information.

5. A pipelined processor, comprising:

a main memory;

a program counter specifying an address of an instruction to be executed in said main memory;

an executing unit for reading out an instruction of the address specified by said program counter from said main memory and for executing the instruction in a pipelined architecture;

a cache memory for storing a predetermined number of instruction blocks requested recently by said executing unit of instructions stored in said main memory to apply to said executing unit an instruction which is required to be read out from said main memory by said executing unit;

a BTB for storing branch information on a branch instruction to be executed by said executing unit to carry out branch prediction based on said branch information and set an address of an instruction to be read out next to the branch instruction in said program counter; and a BTB registration discriminator for decoding the instruction read out from said main memory to said cache memory to register, when the instruction is a branch instruction, branch information on the relevant branch instruction in said BTB.

6. The pipelined processor according to claim 5, wherein said BTB registration discriminator includes a decoder for decoding the instruction read out from said main memory to said cache memory to output a registration command signal commanding said BTB to register the branch information, and branch information generating means for generating and applying to said BTB necessary branch information according to the kind of the instruction decoded by said decoder.

7. The pipelined processor according to claim 6, wherein said decoder decodes the instruction read out from said main memory to said cache memory to output said registration command signal when the relevant instruction is one of a predetermined plurality of kinds of branch instructions and further to output an instruction discriminate signal indicating to which branch instruction of said predetermined plurality of kinds of branch instructions the relevant instruction corresponds.

said branch information generating means includes branch target address generating means for generating respective branch target addresses of said predetermined plurality of kinds of instructions based on an operand of the instruction read out from said main memory to said cache memory and the content of said program counter, and a selector responsive to said instruction discriminate signal for selecting any one of the outputs of said branch target address generating means to apply the selected output to said BTB.

8. The pipelined processor according to claim 5, wherein registration specifying information for specifying whether or not branch information on the relevant branch instruction should be registered in the BTB is set in advance in the branch instruction, said BTB registration discriminator includes a decoder for decoding the instruction read out from said main memory to said cache memory, branch information generating means for generating necessary branch information according to the kind of the instruction decoded by said decoder to apply the generated branch information to said BTB, and registration command means for commanding said BTB to register the branch information according to said registration specifying information.

\* \* \* \* \*